United States Patent [19]

Bresler

[11] 3,942,086
[45] Mar. 2, 1976

[54] SOLID STATE MOTOR CONTROL SYSTEM
[75] Inventor: Burt Bresler, Vernon Hills, Ill.
[73] Assignee: Signode Corporation, Glenview, Ill.
[22] Filed: June 8, 1973
[21] Appl. No.: 368,331

[52] U.S. Cl. .................. 318/447; 318/453; 318/484
[51] Int. Cl.² ........................................ G05B 11/16
[58] Field of Search ................... 156/380, 580, 367; 318/345,445,447, 452–453, 54, 484

[56] References Cited
UNITED STATES PATENTS

| | | | |
|---|---|---|---|
| 2,884,531 | 4/1959 | Bosch | 318/453 X |
| 3,456,179 | 7/1969 | Joslin | 318/453 X |
| 3,523,234 | 8/1970 | Turtle | 318/345 |
| 3,546,556 | 12/1970 | Benkert et al. | 318/345 |
| 3,596,158 | 7/1971 | Watrous | 318/345 |
| 3,634,874 | 1/1972 | Mason | 318/345 |
| 3,669,799 | 6/1972 | Vilcins et al. | 156/359 |
| 3,739,198 | 6/1973 | Clements | 318/345 |
| 3,742,337 | 6/1973 | Digneffe | 318/345 |
| 3,761,789 | 9/1973 | Krafft et al. | 318/345 |
| 3,783,362 | 1/1974 | Basso et al. | 318/DIG. 2 |

Primary Examiner—B. Dobeck
Attorney, Agent, or Firm—Dressler, Goldsmith, Clement & Gordon, Ltd.

[57] ABSTRACT

In a friction-fusion apparatus a solid state control circuit including a triac connected in series with an electric motor, and a control circuit connected across said triac including a resistor and a capacitor and a diac connected between the junctions thereof and the gate electrode of the triac. A voltage control circuit across the capacitor normally limits the voltage across the capacitor to an amplitude insufficient to trigger the diac and is operative in response to a manually actuated switch to increase that voltage, thereby triggering the diac and rendering the triac conductive to operate the motor for a selected time interval.

3 Claims, 2 Drawing Figures

SOLID STATE MOTOR CONTROL SYSTEM

BACKGROUND OF THE INVENTION

There exist apparatus, such as the novel portable and light weight tool disclosed and claimed in commonly assigned Ericsson, U.S. Pat. No. 3,586,572, and Vilcins et al., U.S. Pat. No. 3,669,799, for friction-fusion bonding overlapping portions of a thermoplastic strapping ligature in extremely short period of time. In operation, such apparatus tensions the strap and then frictionally fuses the tensioned overlapping portions of the strap.

Since satisfactory friction-fusion joints are produced quickly, accurate time control of the operation of such apparatus is important. If the fusion operation is terminated too quickly, insufficient frictional heat is generated at the interface of the overlapping portions of the strapping ligature and a joint of inadequate strength is produced. If the fusion operation is prolonged for too long a period of time, excessive heat is generated which again results in the creation of a joint having inadequate strength.

In order to reduce the requirement for a high degree of operator skill, an automatic control circuit is desirable in order that the tool is operated for the appropriate length of time. The necessity for controlling the friction-fusion time is applicable to various types of apparatus for that purpose.

In Frey, U.S. Pat. No. 3,679,519, there is disclosed an electro-mechanical control system for controlling the duration of the operating cycle of a tool for friction-fusing overlapping portions of a thermoplastic strapping ligature. While the control system disclosed in the Frey patent is satisfactory, it can be appreciated that the use of a electro-mechanical control circuits does create problems of reliability and maintenance.

It is therefore highly desirable to utilize a control circuit capable of controlling the overall duration of the operating cycle of a friction-fusion apparatus, capable of adjusting the duration of the operating cycle as desired and which at the same time exhibits a high degree of reliability and minimal maintenance while at the same time utilizing a minimum of space in the tool.

BRIEF SUMMARY OF THE INVENTION

In accordance with the present invention, there is provided a control circuit which has a particular adaptability for adjustably controlling the overall duration of the operating cycle of the tool for friction-fusion overlapping portions of a thermoplastic strapping ligature, which is reliable, which requires minimum maintenance, and which utilizes minimal space in the tool. This is particularly important in the portable tools of the type disclosed in the above identified Ericsson and Vilcins et al. patents, the disclosures of which are hereby incorporated herein in their entirety by reference to the extent not inconsistent herewith, although it should be realized that such a reliable and low maintenance type control circuit has application to any suitable apparatus.

The control circuit of the present invention controls the duration of the operating cycle which includes the withdrawing of the supply of the strapping material to tension a loop about a package and the oscillation of a strap gripping member to generate frictional heat for production of a satisfactory friction-fusion joint.

The control circuit of the present invention incorporates a solid state switching element in series with the tool operating motor. The switching element is controlled by a low voltage switch control circuit adapted to trigger the switching element for a selected period of time to complete a circuit through the motor and to operate the motor, and thereby the tool, for that time period.

More specifically, the control circuit of the present invention includes in addition to the motor switching element connected in series with the motor, a low voltage bias or switch control circuit connected across the switching element and in series with the motor. The low voltage switch control circuit in its quiscent or standby state precludes operation of the motor. When a start switch in the low voltage switch control circuit is operated—depressed and released, a trigger signal is applied to the motor switching element to energize the motor and maintain energization of the motor so long as the trigger signal is applied to the switching element. The duration of the trigger signal is a function of the components of the low voltage switch control circuit and upon completion of the desired time interval, the trigger signal is terminated and the motor de-energized.

The duration of the trigger signal can be adjusted to operate the motor a sufficient time to produce the desired tension in the strapping loop and to provide sufficient oscillation to generate the desired frictional heat at the interface region to produce the friction-fusion joint.

Thus, in accordance with the present invention there is provided a solid state low cost simplified control circuit, which, when energized operates a motor in a friction-fusion tool for a desired adjustable time period, in order to produce a friction-fusion joint of overlapping portions of a thermoplastic strapping ligature.

Numerous other advantages and features of the present invention will become readily apparent from the following detailed description of the invention and of one embodiment thereof, from the claims and from the accompanying drawings in which each and every detail shown is fully and completely disclosed as a part of this specification in which like numerals refer to like parts.

DETAILED DESCRIPTION

Figure 1:
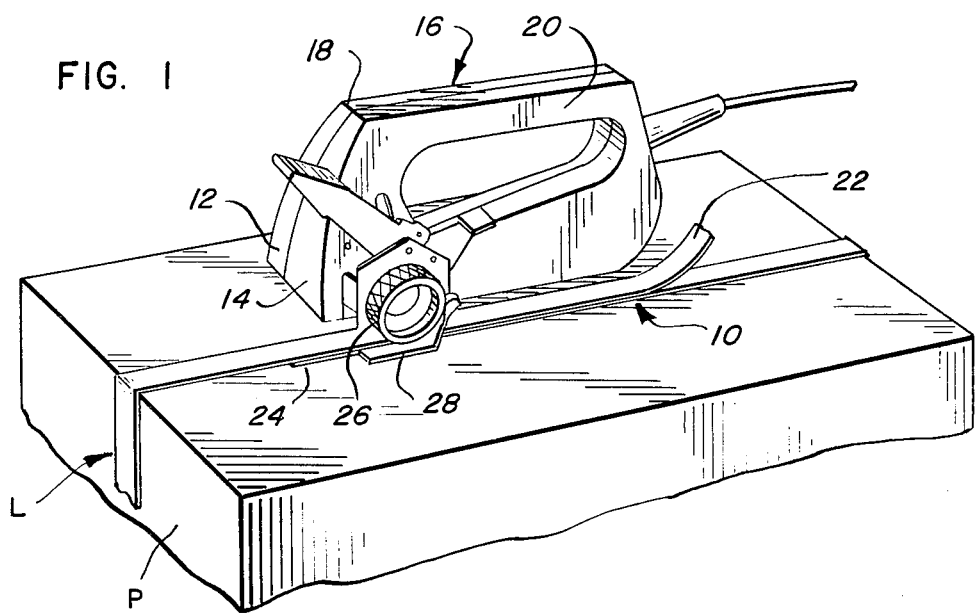
FIG. 1 is a perspective view of a friction-fusion tool in a sealing position on a package with a strapping ligature having been formed into a loop about the package.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

There is shown in FIG. 1 a friction-fusion tool 10, in the form of a housing defined by mating housing members 12, 14 suitably secured together. A handle 16 is provided at the upper end of the tool 10 which is formed of inverted U-shaped portions 18, 20, formed integrally with the housing members 12, 14. The housing members 12, 14 are generally thin walled shell-like structures which collectively define a hollow interior or chamber therebetween in which are disposed various components of the tool as disclosed in the above cited Ericsson, Vilcins et al., and Frey patents. The friction-fusion tool is shown in position on a package P in FIG. 1 with the trailing end portion 22 of a loop L of a thermoplastic strap overlapping a leading end portion 24 of the strap. The trailing strap end portion 22 may extend to a suitable supply of strap (not shown).

The overlapping strap portions 22, 24 are positioned between a strap gripping wheel 26 and a strap supporting anvil 28. Drive means is provided within the chamber of the tool 10 for shifting the anvil 28 upwardly into strap compressing relationship with respect to the wheel 26, for intermittently rotating the wheel 26 to withdraw the upper strap portion 22 to the right, as viewed in FIG. 1, thereby constricting the loop L about the package P and placing the loop L in tension, and for oscillating the wheel 26 relative to the anvil 28 to produce bodily sliding frictional movement between the opposing surface regions of the overlapping strap portions 22, 24 to effect interface melting therebetween. The drive means for accomplishing this includes a motor 30 and other mechanisms such as disclosed in the above identified Ericsson, Vilcins et al. and Frey patents.

Since this all occurs quite rapidly, in a period of between about ¾ of a second to about 1½ seconds, and typically in about 1 second, manual energization and deenergization of the motor to effect the desired friction-fusion of the joint is most difficult and would require exceptional operator skill. Therefore, a control circuit for automatically controlling operation of the motor to effect the desired production of satisfactory friction-fusion joints greatly improves the efficiency in the use of the tool and reliability and quality of the friction-fusion joints produced thereby.

Figure 2:
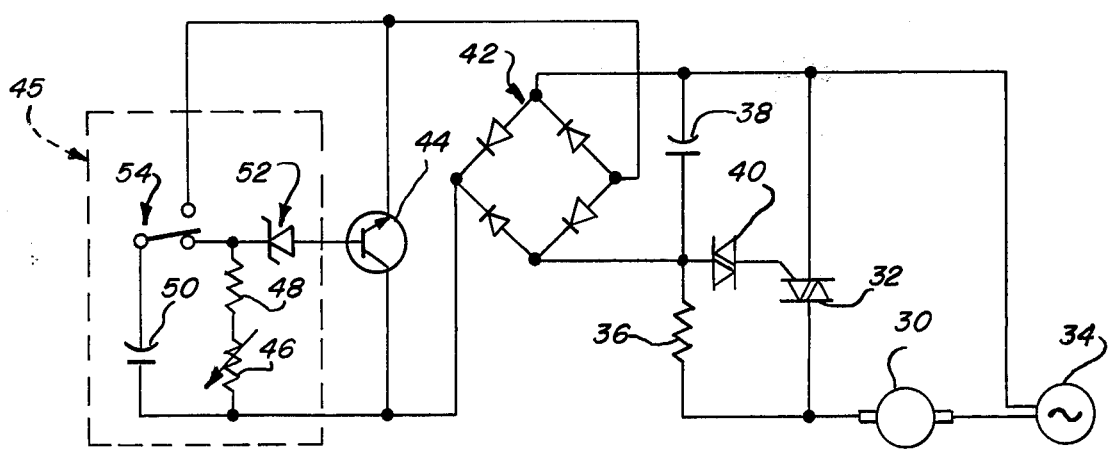
FIG. 2 is a schematic diagram of the control circuit of the present invention.

The control circuit of the present invention for effecting such desired control of the operation of the tool and the motor is disclosed in FIG. 2. The circuit includes the motor 30, connected in a series with a switching element, shown as a triac 32, across a suitable 115 volt or 230 volt AC source 34. The high voltage side of the control circuit also includes a series connected resistor 36 and capacitor 38. A trigger signal control element, shown as a diac 40 is connected to the junction between the resistor 36 and the capacitor 38 and to the gate of the triac 32.

The input terminals of a bridge rectifier 42 are connected across the capacitor 38. The output terminals of the bridge rectifier 42 are connected across the emitter and collector of a control transistor 44. A transistor bias circuit 45 is connected between the base and the collector of the control transistor 44. The transistor bias circuit includes a parallel RC circuit consisting of a pair of series connected resistors, an adjustable resistor 46 and a fixed resistor 48, and a capacitor 50 connected in parallel with the resistors 46, 48.

One side of the capacitor 50 is connected to one side of adjustable resistor 46 and to the collector of the transistor 44, while the other side of the capacitor 50 is connected to one side of the fixed resistor 48 and to the cathode of a Zener diode 52 through the normally closed contact of a starter switch 54. The anode of the Zener diode is connected to the base of the control transistor 44. The normally open contact of the start switch 54 is connected to the emitter of the control transistor 44.

In operation, when power is applied to the circuit, capacitor 38 begins to charge through resistor 36. The voltage across the capacitor 38 is rectified by the bridge rectifier 42 and applied across the collector and emitter of the control transistor 44. This voltage is also applied to the Zener diode 52 through the biasing resistance capacitance circuit 45 connected thereto. When the Zener breakdown voltage is reached, the base of the control transistor is biased on to clamp the voltage across the capacitor 38 at a value less than the triggering voltage of the diac 40.

When the start switch 54 is operated by depressing an appropriate operating member (not shown), the normally closed contacts of start switch 54 are opened and the normally open contacts are closed, thereby charging the bias circuit capacitor 50 to the value of the clamping voltage. When the start switch 54 is released, the switch returns to its normal position, shown in FIG. 2, thereby reducing the voltage applied to the Zener diode and removing the bias signal from the base of the control transistor 44.

The control transistor 44, with the bias signal removed from the base, cuts off to unclamp the voltage across capacitor 38, thereby allowing capacitor 38 to be charged to a higher voltage, required to trigger the diac 40. The triggered diac applies a trigger signal to the gate of the triac 32, renders it conductive to complete the circuit through the motor 30. The motor 30 operates until the diac 40 is deenergized removing the trigger signal from the gate of the triac 32.

The diac 40 is de-energized when the bias capacitor 50 has discharged through the bias resistors 46, 48 to a point where the Zener breakdown voltage is again reached biasing the control transistor 44 on, clamping the voltage across capacitor 38 to a value lower than the diac triggering voltage, and thereby removing the trigger signal from the gate of the triac 40 and the motor 30 is de-energized.

Since the duration of the operation of the motor 30 is a function of the discharge time of the bias capacitor 50 which is a function of the RC time constant, the duration of operation of the motor can be controlled by adjusting either the capacitance of capacitor 50 or the resistance of the resistor 46, to increase or decrease the time required for the capacitor to discharge to the Zener breakdown voltage.

In one illustrated embodiment, the components in the control circuit are as follows:

| | |
|---|---|
| Triac 32 | RCA 40430 |
| Resistor 36 | 22K (115 VAC) or 100K (230VAC) |
| Capacitor 38 | 0.1 μf |
| Diac 40 | G. E. st2 |
| Bridge Rectifier 42 | MOA 920-44 |
| Transistor 44 | 2N 3568 |
| Resistor 46 | 200K |
| Resistor 48 | 15K |
| Capacitor 50 | 6.8 pf |
| Zener diode 52 | 1N 5246 |

Thus, there has been disclosed a control circuit for controlling the duration of time for energization of a motor and of a friction-fusion tool which is reliable and simple, in which all external controls, which includes time adjustment and start switches on low voltage, and in which bulky mechanical components are eliminated, except for the start switch. The reliability of such a solid state switching control circuit as compared to an electro-mechanical circuit is improved, the amount of sapce required for such a circuit is reduced, the maintenance requirements for such circuit are minimized, and the desired control effected.

From the foregoing, it will be observed that numerous variations and modifications may be effected without departing from the true spirit and scope of the novel concept of the invention. It is, of course, intended to cover by the appended claims all such modifications as fall within the scope of the claims.

I claim:

1. A solid state timing control system for regulating the operating cycle of an electric motor which comprises:

first normally non-conductive solid state switching means connected in series with said motor, said first solid state switching means precluding operation of said motor when in non-conductive state and effecting operation of said motor substantially at line voltage during entire operating cycle when in conductive state;

a resistor and a first capacitor connected in series with said motor and in parallel with said first solid state switching means, the value of said resistor being selected to limit the current passing through said resistor-capacitor circuit to preclude operation of said motor;

a second, voltage responsive solid state switching means connected between said first solid state switching means and the junction between said resistor and said first capacitor and rendering said first solid state switching means conductive in response to a predetermined voltage;

bridge rectifier means having input terminals thereof connected across said first capacitor;

a transistor having emitter and collector thereof connected across output terminals of said rectifier means;

a bias circuit including an adjustable bias resistor connected in series with a Zener diode and a second capacitor connected in parallel with said adjustable bias resistor, either said transistor collector or emitter being connected to one side of said second resistor and said second capacitor, the base of said transistor being connected to the anode of said Zener diode, the other side of said second capacitor being connected to the junction of said resistor and said Zener diode through the normally closed contacts of a manually operated switch and to said emitter or collector not connected to said bias resistor through the normally open contacts of said manually operated switch;

said bias circuit being operative to render said transistor conductive in response to the voltage across said first capacitor reaching a selected value less than a pre-selected value required to render said second voltage responsive solid state switching means conductive; said second capacitor charging in response to actuation of said manually operated switching means connecting said capacitor across said transistor collector and emitter and discharging through said adjustable bias resistor in response to de-actuation of said manually operated switching means for rendering said transistor non-conductive and connecting said capacitor across said adjustable bias resistor, thereby allowing the voltage across said first capacitor to increase to said pre-selected value to render said second voltage responsive solid state switching means conductive; said first solid state switching means being rendered conductive in response to said second solid state switching means being rendered conductive to effect operation of said motor for a selected time interval determined by the discharge time of said second capacitor.

2. A control system as claimed in claim 1, wherein said first solid state switching means is a triac and said second solid state switching means is connected to the gate electrode of said triac.

3. A control system as claimed in claim 2, wherein said second solid state switching means is a diac.

* * * * *